(12) United States Patent
Majewski

(10) Patent No.: US 12,492,148 B1
(45) Date of Patent: Dec. 9, 2025

(54) CARBON NEGATIVE CEMENTITIOUS COMPOSITION AND BUILDING MATERIALS

(71) Applicant: Phytostone LLC, Buffalo, NY (US)

(72) Inventor: Emily Majewski, Buffalo, NY (US)

(73) Assignee: Phytostone LLC, Buffalo, NY (US)

( * ) Notice: Subject to any disclaimer, the term of this patent is extended or adjusted under 35 U.S.C. 154(b) by 0 days.

(21) Appl. No.: 18/909,313

(22) Filed: Oct. 8, 2024

(51) Int. Cl.
  *C04B 28/10* (2006.01)
  *C04B 14/04* (2006.01)
  *C04B 18/10* (2006.01)
  *C04B 18/24* (2006.01)
  *C04B 22/00* (2006.01)
  *C04B 22/10* (2006.01)

(52) U.S. Cl.
  CPC .......... *C04B 28/105* (2013.01); *C04B 14/041* (2013.01); *C04B 14/043* (2013.01); *C04B 18/101* (2013.01); *C04B 18/248* (2013.01); *C04B 22/0013* (2013.01); *C04B 22/106* (2013.01)

(58) Field of Classification Search
  CPC ... C04B 28/105; C04B 14/041; C04B 14/043; C04B 18/101; C04B 18/248; C04B 22/0013; C04B 22/106; C04B 28/10; C04B 18/10; C04B 18/24; C04B 18/18; C04B 14/04
  See application file for complete search history.

(56) References Cited

U.S. PATENT DOCUMENTS

| | | | |
|---|---|---|---|
| 2014/0096704 A1* | 4/2014 | Rademan | C04B 12/025 106/666 |
| 2021/0323870 A1* | 10/2021 | Wu | C04B 14/06 |
| 2022/0106789 A1 | 4/2022 | Kuse et al. | |
| 2022/0298073 A1 | 9/2022 | Pecha et al. | |

FOREIGN PATENT DOCUMENTS

| | | | | |
|---|---|---|---|---|
| CN | 105503058 A | 4/2016 | | |
| CN | 108623248 A | 10/2018 | | |
| CN | 109250976 A | 1/2019 | | |
| CN | 114538850 A | 5/2022 | | |
| CN | 114804734 A | 7/2022 | | |
| DE | 102021001327 A1 | 9/2022 | | |
| WO | 2019/086780 A1 | 5/2019 | | |
| WO | 2024/033294 A1 | 2/2024 | | |
| WO | 2024/076666 A1 | 4/2024 | | |
| WO | 2024/083983 A1 | 4/2024 | | |
| WO | WO-2024084245 A1 * | 4/2024 | | C04B 16/00 |
| WO | 2024/110296 A1 | 5/2024 | | |

* cited by examiner

*Primary Examiner* — Amber R Orlando
*Assistant Examiner* — Marites A Guino-O Uzzle
(74) *Attorney, Agent, or Firm* — Medler Ferro Woodhouse & Mills PLLC

(57) ABSTRACT

Cementitious wet mixtures and solids such as architectural tiles providing carbon sequestration and being overall carbon negative. The cementitious solids include a binder including magnesium, a catalyst including a metal salt, and biomass.

20 Claims, No Drawings

CARBON NEGATIVE CEMENTITIOUS COMPOSITION AND BUILDING MATERIALS

TECHNICAL FIELD

The present disclosure relates to cementitious compositions and building materials, such as wall and ceiling tiles formed from those compositions. The cementitious compositions are carbon negative by incorporating substantially higher amounts of carbon.

BACKGROUND

Conventional building materials release greenhouse gases during one or more of: the manufacturing process, during transportation, during customer use and end of life. The manufacture of most products involves the generation of greenhouse gas emissions by using raw materials which have been mined or manufactured using fossil fuels and/or by transporting the product and/or reagents. To transition the industry to a net neutral position or to reduce the carbon footprint of the construction sector, it is desired to utilize building materials that remove carbon dioxide from the atmosphere.

One strategy to increase the carbon incorporated into building material is to incorporate biochar in cement. However, typical cement, such as Portland Cement, including biochar have two major drawbacks. First, ordinary Portland Cement is notoriously unecological and therefore the eco-improvements offered by the inclusion of carbon are largely negated by the carbon impacts of this mineral binder. For example, Portland cement clinker is made by heating, in a cement kiln, a mixture of raw materials to a calcining temperature of about 600° C. (1,112° F.) and then a fusion temperature, which is about 1,450° C. (2,640° F.). Second, the percentage of carbon able to be incorporated into ordinary cement has to date been very limited, typically ranging from the lower end of 1% to rare instances of 20-30%. Accordingly, there is a need for improved cementitious compositions that are more ecological and can incorporate larger percentages of carbon in building materials.

SUMMARY

Applicant determined cementitious binder material that is less hostile to carbon incorporation and that requires lower temperatures in formation and overall improvement in carbon impact compared to existing cementitious compositions used in building materials.

In one aspect, disclosed is a cementitious solid including a binder including magnesium, a catalyst including a metal salt or ammonium salt, and biomass. In another aspect, disclosed is a wet mixture including a binder including magnesium, a catalyst including a metal salt or ammonium salt, biomass, and water.

In embodiments of either of the above aspects, the binder comprises magnesium oxide, magnesium hydroxide, magnesium oxychloride cement, magnesium oxysulfate cement, magnesium carbonate cement, or magnesium phosphate cement. In particular embodiments, the binder comprises magnesium oxide, magnesium oxysulfate cement, or magnesium carbonate cement. In yet more particular embodiments, the binder comprises magnesium oxide or magnesium carbonate cement.

In embodiments in combination with any of the above aspects or embodiments, the catalyst comprises an alkali metal salt. In particular embodiments, the catalyst comprises at least one of alkali metal carbonate, alkali metal bicarbonate, or alkali metal borate. In particular embodiments, the catalyst comprises at least one of sodium carbonate, sodium bicarbonate, or sodium tetraborate. In more particular embodiments, the catalyst is a combination of metal carbonate and metal borates. In yet more particular embodiments, the catalyst is a combination of sodium bicarbonate and sodium tetraborate.

In embodiments in combination with any of the above aspects or embodiments, the biomass comprises biochar, straw, hemp, bamboo, wood fibers, mulch-type materials or combinations thereof. In certain embodiments, the biomass comprises biochar and hemp. In certain embodiments, the biomass comprises biochar and straw. In certain embodiments, the biomass comprises biochar and mulch-type materials. In certain embodiments, the biomass comprises biochar with straw, hemp, and/or cellulose fibers.

In embodiments in combination with any of the above aspects or embodiments, the solid or mixture further comprises metal silicate. In particular embodiments, the metal silicate is an alkaline earth metal silicate or boron group metal silicate. In more particular embodiments, the metal silicate is aluminum silicate or calcium silicate. The metal silicate can act as an activator for the cementitious mixture or solid.

In embodiments in combination with any of the above aspects or embodiments, composition of the cementitious solid comprises 40 wt % to 75 wt % binder, 20 wt % to 57 wt % biomass, and 3 wt % to 10 wt % catalyst based on the total weight percentage of the binder, the catalyst, and the biomass. In other embodiments in combination with any of the above aspects or embodiments, composition of the cementitious solid comprises 30 wt % to 60 wt % binder, 5 wt % to 15 wt % hemp, and 3 wt % to 7 wt % catalyst, and 30 wt % to 60 wt % biochar based on the total weight percentage of the binder, the catalyst, the biomass, and the biochar.

The cementitious wet mixture according to any of the embodiments disclosed above can be used to form any shaped object through a mold based process or 3D-printing. The cementitious wet mixture or solid has particular use in construction as a building material. Examples of such building material includes tiles or exterior cladding. Tiles include, for example, floor tiles, wall tiles, or drop ceiling tiles.

DETAILED DESCRIPTION

Before describing several exemplary embodiments, it is to be understood that the invention is not limited to the details of construction or process steps set forth in the following description. The invention is capable of other embodiments and of being practiced or being carried out in various ways.

Reference throughout this specification to "one embodiment," "certain embodiments," "one or more embodiments" or "an embodiment" means that a particular feature, structure, material, or characteristic described in connection with the embodiment is included in at least one embodiment. Thus, the appearances of the phrases such as "in one or more embodiments," "in certain embodiments," "in one embodiment" or "in an embodiment" in various places throughout this specification are not necessarily referring to the same embodiment. Furthermore, the particular features, structures, materials, or characteristics may be combined in any suitable manner in one or more embodiments.

Although reference herein is to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

Reference throughout this specification to "a" or "an" represents one or more and is not limited to singular form, unless explicitly stated.

Disclosed is a composition for forming cementitious solids, a cementitious solid formed from the composition, and building materials, such as tiles, formed from said composition. The disclosed composition incorporates substantially more carbon than traditional cementitious compositions and/or cementitious solids. In addition, the disclosed composition requires less energy to form the cementitious solid than traditional cementitious compositions. This combination of incorporation of higher carbon contents and the lower energy requirements in formation enable carbon negative building materials.

According to an aspect, the disclosed cementitious composition includes a binder including magnesium, biomass, and a catalyst including an alkali metal salt or alkaline earth metal salt.

In embodiments, the binder including magnesium is a magnesium oxide, magnesium hydroxide, or magnesium based cement. Magnesium based cement includes magnesium oxychloride cement, which is also known as Sorel cement or magnesite. The magnesium oxychloride cement can be formed by a combination of magnesium oxide and magnesium chloride solution. Another example of magnesium based cement includes magnesium oxysulfate cement, which is the sulfate analogue of magnesium oxychloride and can be formed by a combination of magnesium oxide and magnesium sulfate solution. Yet another example of magnesium based cement is magnesium phosphate cement, which can be formed by a reaction between magnesium oxide and a soluble phosphate. A typical soluble phosphate in the formation of magnesium phosphate cement includes ammonium phosphate monobasic ($NH_4H_2PO_4$). Yet a further example of magnesium based cement is magnesium carbonate cement, which can be formed by a combination of magnesium oxide and magnesium carbonate solution.

In embodiments, the catalyst includes an alkali metal salt, alkaline earth metal salt, or ammonium salt. In particular embodiments, the salts of the catalyst are carbonates, sulfates, phosphates, or borates or combinations thereof. In certain embodiments, the alkali metal carbonates, alkali metal bicarbonates, or alkali metal borates, individually or in combination, are used as the catalyst. For example, in some embodiments, a combination of alkali metal carbonate and alkali metal borate is utilized. In another embodiment, a combination of alkali metal bicarbonate and alkali metal borate is utilized.

In embodiments, the weight percentage of the binder based on the total amount of the cementitious composition is at least 20%, 25%, or 30% and no more than 35%, 40%, or 45%.

In embodiments in which the binder is magnesium oxide, the catalyst may include a carbonate or bicarbonate with or without a borate. In certain embodiments, the binder is magnesium oxide and the catalyst is alkali metal bicarbonate. In other embodiments, the binder is magnesium oxide and the catalyst is alkali metal carbonate. In yet other embodiments, the binder is magnesium oxide and the catalyst is a combination of alkali metal bicarbonate and alkali metal borate.

In embodiments, the weight percentage of the catalyst based on the total amount of the cementitious composition is at least 3%, 4%, or 5% and no more than 6%, 7%, or 8%. In embodiments, the weight ratio of binder to catalyst is 10:1 to 5:1 or 8:1 to 5:1 or 7:1 to 6:1.

To form typical cement, Portland cement clinker is heated in a cement kiln to a calcining temperature of about 600° C. (1,112° F.) and then a fusion temperature of about 1,450° C. (2,640° F.), in contrast, the cement disclosed herein containing a binder containing magnesium and a catalyst containing an alkali metal salt or alkaline earth metal salt require only calcining at temperatures between 700° C. and 1000° C. compared to the two stage process with temperatures of about 1,450° C. for Portland cement. The lower temperature requirements for the cement disclosed herein results in lower energy requirements.

In embodiments, the biomass includes hemp, wood, bamboo, straw, mulch-type materials, or other cellulosic material, or biochar or a combination thereof. Herein, "biochar" is any carbon-rich material made by subjecting biomass to pyrolysis. In certain embodiments, the biomass is limited to non-biochar biomass and results in a creamy white coloring. In other embodiments, the biomass includes biochar and results in a grayish white coloring.

The disclosed combination of binder and catalyst enables a substantially improved compatibility with carbon compared to traditional cementitious compositions. Specifically, percentage of carbon that can be incorporated into embodiments of the cementitious composition disclosed herein is 30% to 80% carbon. In particular embodiments, the carbon incorporated is 50% to 80% carbon.

In embodiments, the weight percentage of biomass based on the total amount of the cementitious composition is at least 15%, 20%, 25%, or 30% and no more than 40%, 45%, or 50%. In particular embodiments, weight percentage of cellulosic material, such as hemp, based on the total amount of the cementitious composition is at least 5%, 10%, or 15% and no more than 20%, 25%, or 30%. In particular embodiments, weight percentage of biochar based on the total amount of cementitious composition is 0%, 10%, 15%, 20% or 25% and no more than 30%, 35%, 40%, or 45%.

In embodiments, the cementitious composition includes 40 wt % to 75 wt % or 50 wt % to 60 wt % binder, 20 wt % to 57 wt % or 30 wt % to 50 wt % or 30 wt % to 40 wt % biomass, and 3 wt % to 10 wt % or 5 wt % to 8 wt % catalyst based on the total weight percentage of the binder, the catalyst, and the biomass. In other embodiments, the cementitious composition includes 30 wt % to 60 wt % or 40 wt % to 50 wt % binder, 5 wt % to 15 wt % or 7 wt % to 10 wt % hemp, and 3 wt % to 7 wt % or 4 wt % to 6 wt % catalyst, and 30 wt % to 60 wt % or 40 wt % to 50 wt % biochar based on the total weight percentage of the binder, the catalyst, the biomass, and the biochar.

In addition to the binder, catalyst, and biomass discussed above, cementitious compositions may further include activators. In embodiments, activators are metal silicates. In embodiments, the metal in the silicates is selected from alkali metal, alkaline earth metal or aluminum. In particular embodiments, the activator is an aluminum silicate or a calcium silicate. Examples of such silicates include kaolin or wollastonite. In embodiments, combinations of more than one activator are included. For example, different ratios of kaolin and wollastonite can be used.

In embodiments, the weight percentage of the optional activator based on the total amount of the cementitious composition is at least 20%, 25%, or 30% and no more than 35%, 40%, or 45%.

In embodiments, the cementitious compositions may include other optional additives. The additives could include carboxymethylcellulose, calcium bentonite, or reinforcement fibers. Such optional reinforcement fibers could be steel or basalt fibers.

The disclosed cementitious compositions and solids made therefrom offer a unique set of advantages combining typical building material properties of wood and stone. For example, the cementitious solids offer the advantages of wood with regard to being lightweight, renewable, biodegradable, carbon sequestering, nailable/cuttable/screwable, and insulative, while simultaneously offer the advantages of stone with regard to dimensional stability, insolubility in water, being bug proof, and being fireproof. In particular embodiments, the cementitious solid is an architectural tile. In more particular embodiments, the cementitious solid is a floor tile, wall tile or a dropped ceiling tile.

With regard to carbon sequestration, embodiments of the cementitious solid can store more carbon than Douglas Fir without any of the flammability. Further, embodiments of the cementitious solid can represent over 100% reduction in embodied carbon compared to traditional ceramic tiles. Further, unlike wood, cross laminated timber, hemp or bamboo, biochar locked in embodiments of cementitious solid does not revert to carbon dioxide emissions at end of product life (decomposition). Thus, embodiments of the cementitious solid offer permanent carbon storage compared to other biogenic carbon sources.

Cementitious solids containing the cementitious compositions disclosed above may be prepared by processes known in the art. The examples below are illustrative of such processes but are not intended to be limiting.

Example 1: Cementitious Solid Including Biochar

The cementitious solid was formed by mixing the dry ingredients and then water was added to create a slurry. The slurry was pressed and air cured (no kilning). The dry ingredients included the following:

0.46 kg cellulosic material
2.95 kg biochar
2.49 kg activator
2.37 kg magnesium oxide
0.38 kg catalyst
0.196 additives.

Example 2: Cementitious Solid Without Biochar

The cementitious solid was formed by mixing the dry ingredients and then water was added to create a slurry. The slurry was pressed and air cured (no kilning). The dry ingredients included the following:

1.518 kg cellulosic material
2.49 kg activator
2.705 kg activator
0.412 kg catalyst
0.212 additives.

Testing and Results

Examples 1 and 2 were tested with regard to any fire concerns. Specifically, Examples 1 and 2 had flame spread index of 0 and smoke developed index of 0 based on ASTM E84, Standard Test Method for Surface Burning Characteristics of Building Materials.

Examples 1 and 2 were also tested with regard to insulation regarding thermal transfer. Specifically, heat flow meter testing was performed according to ASTM C518. The results are provided in the table below:

| Sample Name | Avg. Heat Flux ($W/m^2$) | Avg. Thermal Conductance (C) ($W/m^2 \cdot K$) | Avg. Thermal Resistance (Rsi) ($m^2 \cdot K/W$) | Avg. Thermal Resistivity (r) ($m \cdot K/W$) | Apparent Thermal Conductivity (k) $W/m \cdot K$ | Specimen Avg. Thickness (mm) | Specimen Avg. Density ($kg/m^2$) |
|---|---|---|---|---|---|---|---|
| Example 1 | 140.43 | 5.062 | 0.20 | 7.70 | 0.130 | 25.60 | 705.98 |
| Example 2 | 143.32 | 5.154 | 0.19 | 7.28 | 0.137 | 26.62 | 625.75 |

Based on the above testing, it was confirmed that embodiments of the cementitious solid maintain fire prevention and thermal transfer similar to that of traditional cementitious tile with the advantage of substantial carbon sequestration resulting in carbon negative building materials.

What is claimed is:

1. A cementitious solid comprising:
    a binder including magnesium;
    a catalyst, wherein the catalyst is at least one of alkali metal carbonate, alkali metal bicarbonate, or alkali metal borate; and
    biomass,
    wherein composition of the cementitious solid comprises 40 wt % to 75 wt % binder, 20 wt % to 57 wt % biomass, and 3 wt % to 10 wt % catalyst based on the total weight percentage of the binder, the catalyst, and the biomass.

2. The cementitious solid according to claim 1, wherein the binder comprises magnesium oxide, magnesium hydroxide, magnesium oxychloride cement, magnesium oxysulfate cement, magnesium carbonate cement, or magnesium phosphate cement.

3. The cementitious solid according to claim 1, wherein the catalyst is at least one of sodium carbonate, sodium bicarbonate, or sodium tetraborate.

4. The cementitious solid according to claim 1, wherein the biomass comprises biochar.

5. The cementitious solid according to claim 1, wherein the biomass comprises straw, hemp, and/or mulch materials.

6. The cementitious solid according to claim 1, wherein the biomass comprises a combination of hemp and biochar.

7. The cementitious solid according to claim 6, wherein composition of the cementitious solid comprises 40 wt % to 60 wt % binder, 5 wt % to 15 wt % hemp, and 3 wt % to 7 wt % catalyst, and 30 wt % to 50 wt % biochar based on the total weight percentage of the binder, the catalyst, the hemp, and the biochar, and wherein the total of hemp and biochar is between 20 wt % to 57 wt % based on the total weight percentage of the binder, the catalyst, the hemp, and the biochar.

8. The cementitious solid according to claim 1, further comprising metal silicate.

9. The cementitious solid according to claim 8, wherein the metal silicate comprises aluminum silicate or calcium silicate.

10. A building material comprising the cementitious solid according to claim 1.

11. A tile comprising the cementitious solid according to claim 1.

12. A mixture for use with water to form a slurry, comprising:
   a binder including magnesium;
   a catalyst, wherein the catalyst is at least one of alkali metal carbonate, alkali metal bicarbonate, or alkali metal borate;
   biochar; and
   additional biomass,
   wherein composition of the cementitious solid comprises 30 wt % to 60 wt % binder, 5 wt % to 15 wt % additional biomass, and 3 wt % to 7 wt % catalyst, and 30 wt % to 60 wt % biochar based on the total weight percentage of the binder, the catalyst, the additional biomass, and the biochar.

13. The mixture according to claim 12, wherein the binder comprises magnesium oxide, magnesium hydroxide, magnesium oxychloride cement, magnesium oxysulfate cement, magnesium carbonate cement, or magnesium phosphate cement.

14. The mixture according to claim 12, wherein the additional biomass comprises straw, cellulose fibers, hemp, and/or mulch materials.

15. The mixture according to claim 12, further comprising metal silicate.

16. A cementitious solid formed from the mixture according to claim 12.

17. A mixture for use with water to form a slurry, comprising:
   a binder including magnesium;
   a catalyst including a metal salt or ammonium salt; and
   biomass,
   wherein the mixture comprises 30 wt % to 50 wt % of the binder, 40 wt % to 67 wt % of the biomass, and 3 wt % to 10 wt % of the catalyst based on the total weight percentage of the binder, the catalyst, and the biomass.

18. The mixture according to claim 17, wherein the mixture comprises 30 wt % to 40 wt % of the binder, 55 wt % to 67 wt % of the biomass, and 3 wt % to 10 wt % of the catalyst based on the total weight percentage of the binder, the catalyst, and the biomass.

19. The mixture according to claim 17, wherein the biomass comprises biochar and/or hemp.

20. A cementitious solid formed from the mixture according to claim 17.

* * * * *